(12) United States Patent
Wellbrock et al.

(10) Patent No.: US 9,078,053 B2
(45) Date of Patent: Jul. 7, 2015

(54) COMMUNICATIONS SYSTEM ARCHITECTURE AND DESIGN

(71) Applicant: Verizon Patent and Licensing Inc., Basking Ridge, NJ (US)

(72) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/010,798

(22) Filed: Aug. 27, 2013

(65) Prior Publication Data

US 2015/0063799 A1    Mar. 5, 2015

(51) Int. Cl.
*G02B 6/36* (2006.01)
*H04Q 11/00* (2006.01)

(52) U.S. Cl.
CPC ... *H04Q 11/0005* (2013.01); *H04Q 2011/0037* (2013.01)

(58) Field of Classification Search
CPC ................ H04Q 11/0005; G02B 6/3582
See application file for complete search history.

(56) References Cited

U.S. PATENT DOCUMENTS

| | | | | |
|---|---|---|---|---|
| 5,818,984 A | * | 10/1998 | Ahmad et al. | 385/14 |
| 6,430,333 B1 | * | 8/2002 | Little et al. | 385/18 |
| 7,680,367 B2 | * | 3/2010 | Matsuoka et al. | 385/14 |
| 2014/0205285 A1 | * | 7/2014 | Jiang | 398/45 |

* cited by examiner

*Primary Examiner* — Omar R Rojas

(57) ABSTRACT

A network device includes a plurality of optical input/output (I/O) units to exchange one or more optical signals with the optical network. The network device further includes a switch fabric to process one or more optical signals exchanged with an optical network. The network device also includes a connector configured to receive a connector to couple the network device to another device. The network device also includes a base layer connecting to the plurality of optical I/O units and the switch fabric. The base layer is included in a connection that does not include a back plane and that enables communications between the plurality of I/O units, the switch fabric, and the connector.

17 Claims, 14 Drawing Sheets

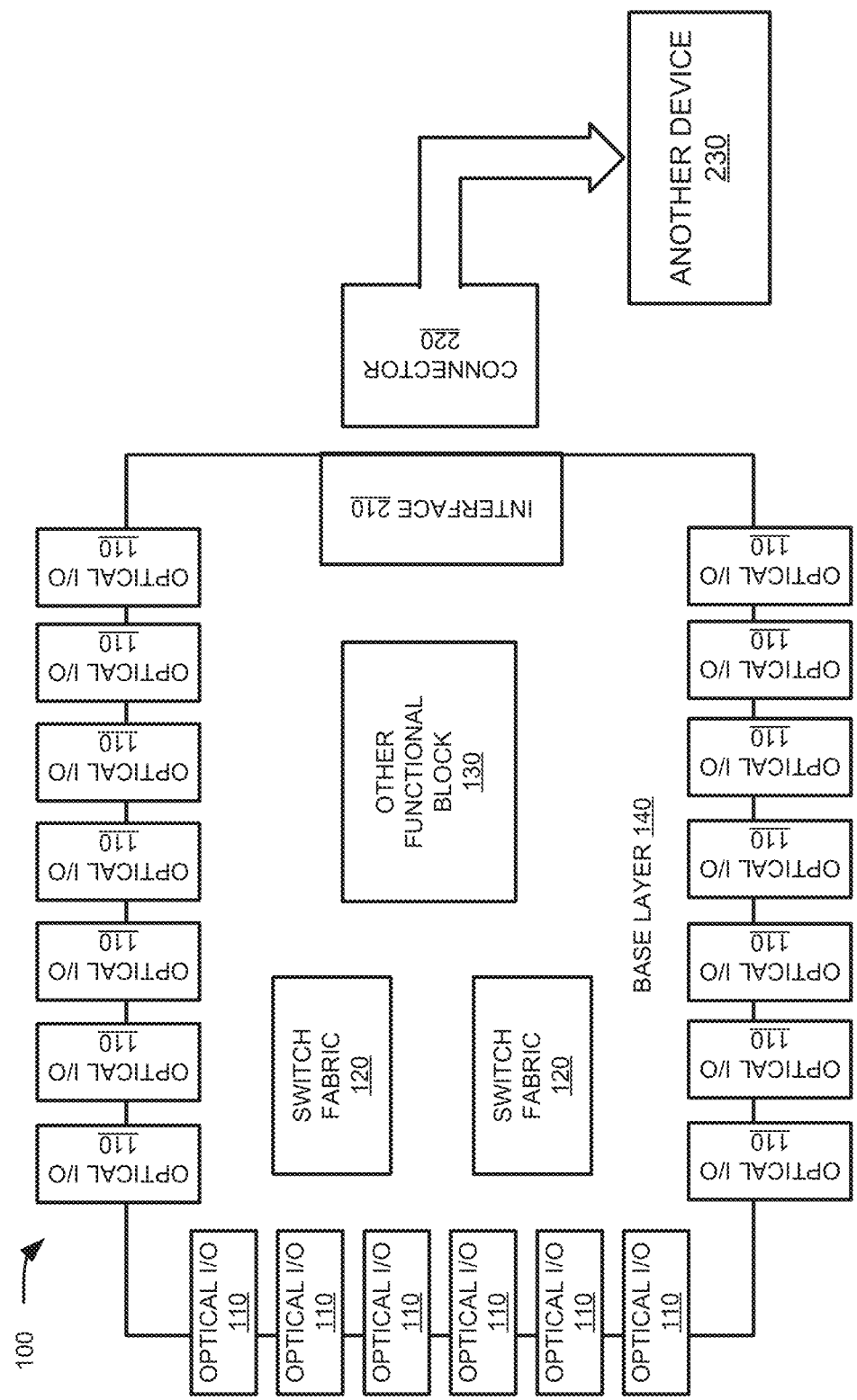

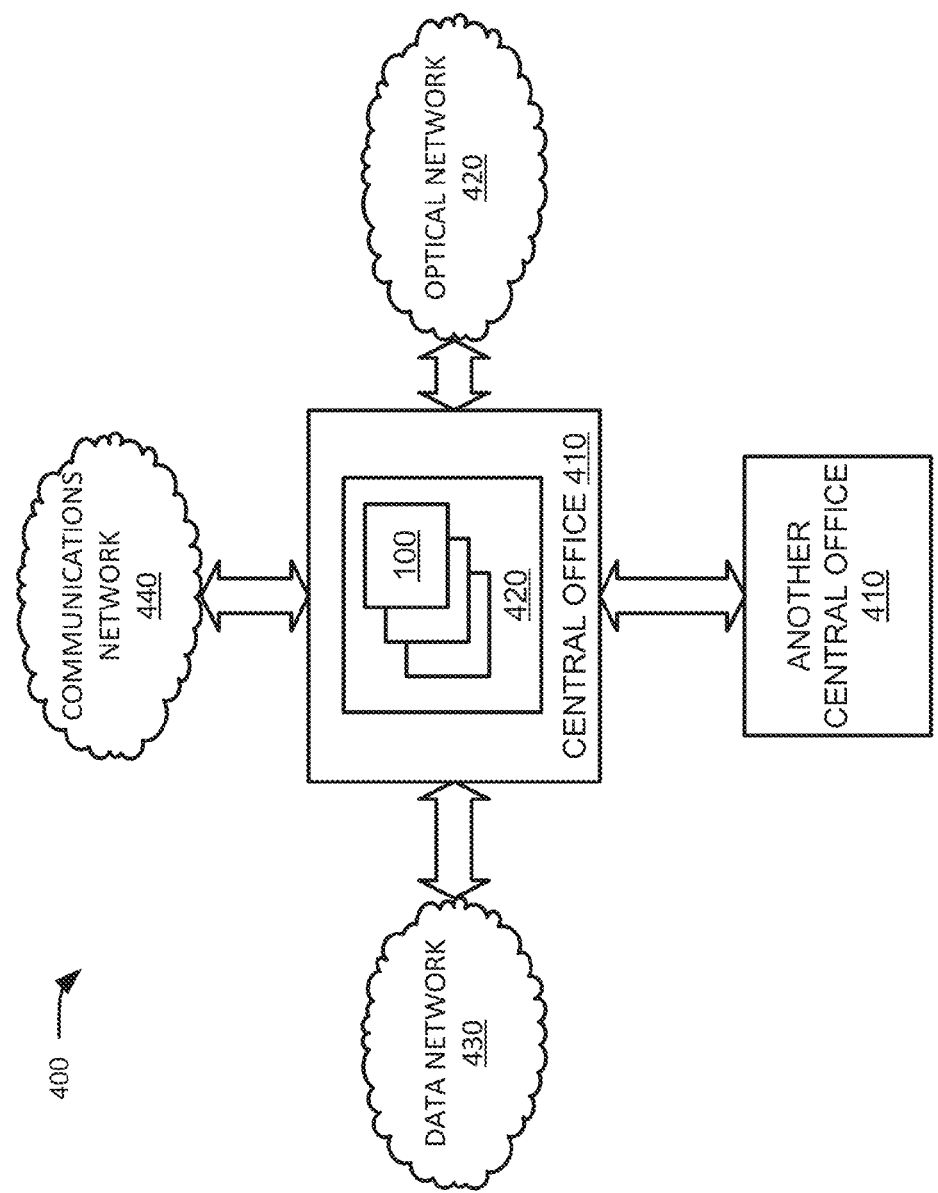

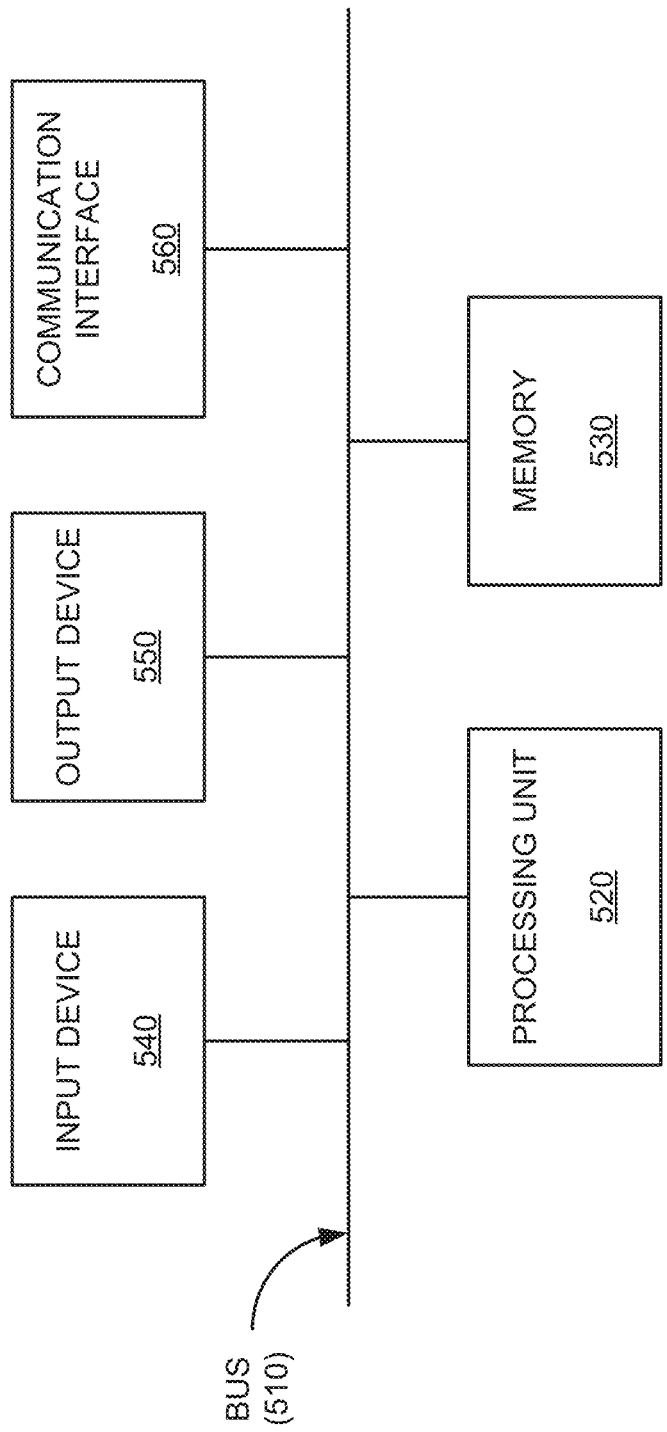

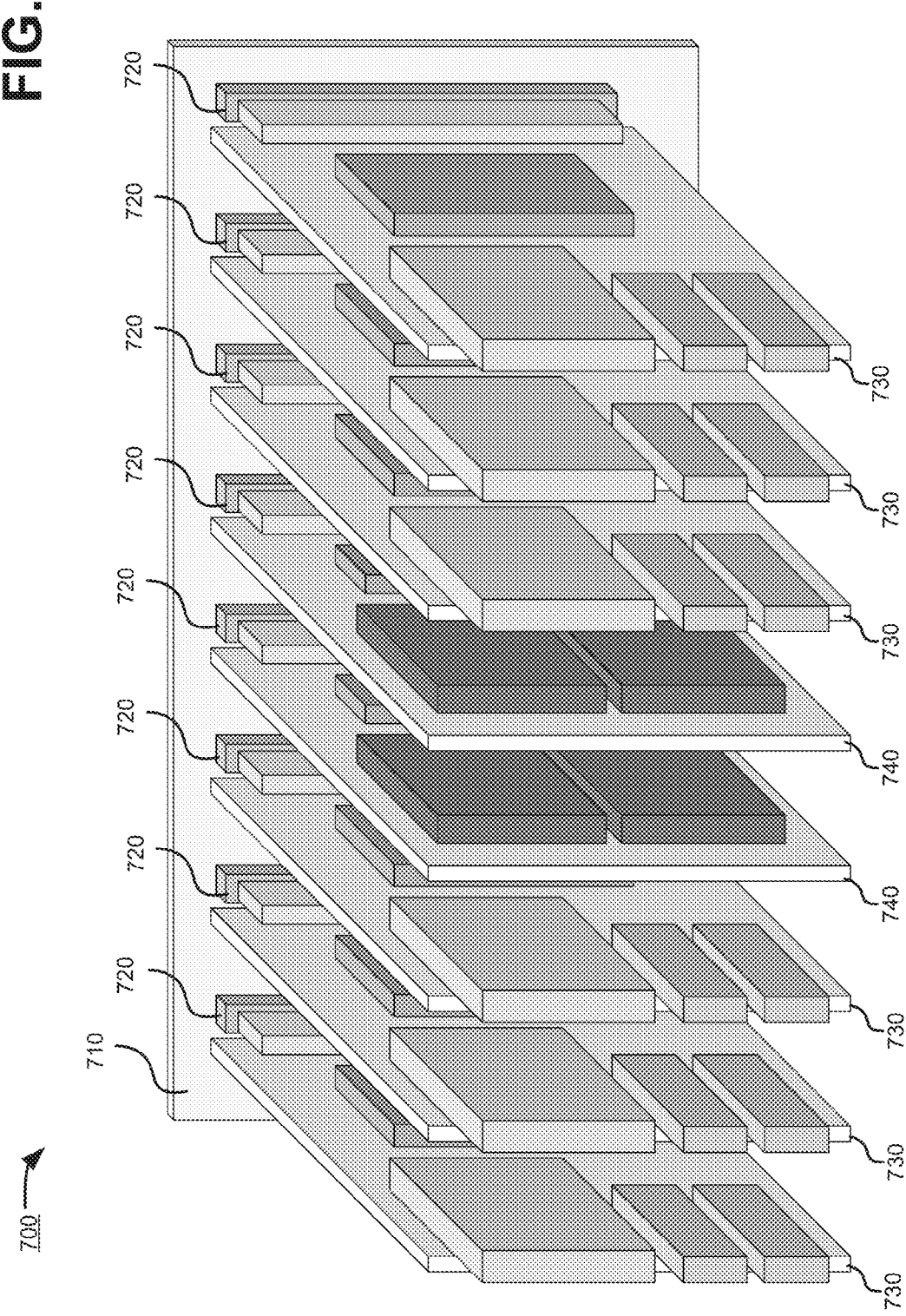

COMMUNICATIONS SYSTEM ARCHITECTURE AND DESIGN

BACKGROUND

With ever increasing demand for data bandwidth by consumers, further increases in bandwidth for optical communication devices are limited by existing architecture. A new communication equipment design is needed to provide capacity growth.

BRIEF DESCRIPTION OF THE DRAWINGS

FIGS. 1A-1C, 2A-2C, and 3A-3C are block diagrams illustrating components of an exemplary network device according to implementations described herein;

FIG. 4 illustrates an exemplary network in which systems and/or methods described herein may be implemented;

FIG. 5 is a diagram of exemplary components of a telecommunications device that may be used within the network of FIG. 4;

FIGS. 7A and 7B are block diagrams illustrating an exemplary alternative network device.

DETAILED DESCRIPTION OF PREFERRED EMBODIMENTS

The following detailed description refers to the accompanying drawings. The same reference numbers in different drawings may identify the same or similar elements.

The systems and methods provided herein relate to a communication equipment architecture that may provide for greater bandwidth capacity in an optical network. As described, herein, a communications device, based on the communication equipment architecture, may include one or more optical input/output (I/O) units to exchange optical signals via an optical network and a switch fabric for processing the optical signals. According to the communication equipment architecture, the optical I/O unit and the switch fabric may be included in a single component, such as a printed circuit board, such that the optical I/O unit and the switch fabric may communicate through direct connections and a minimum number of intermediate components.

Figure 1A:
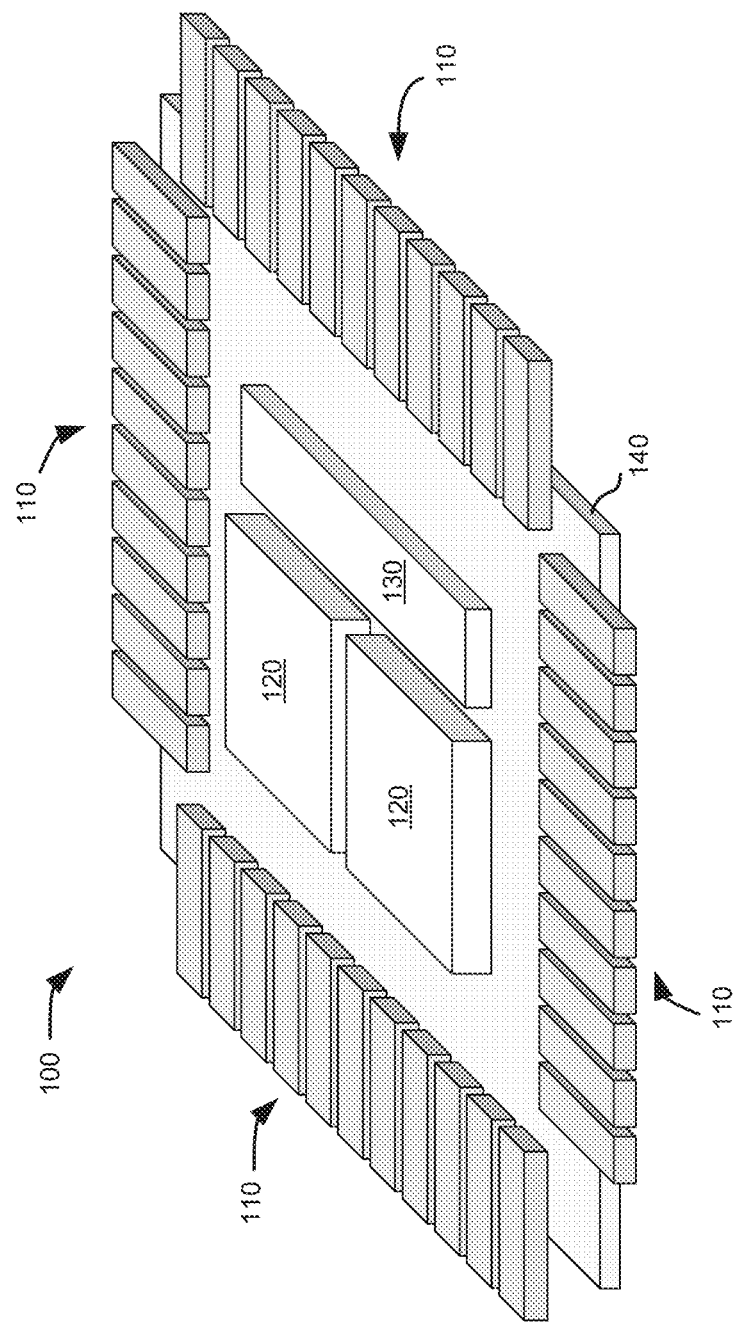
Figure 1B:
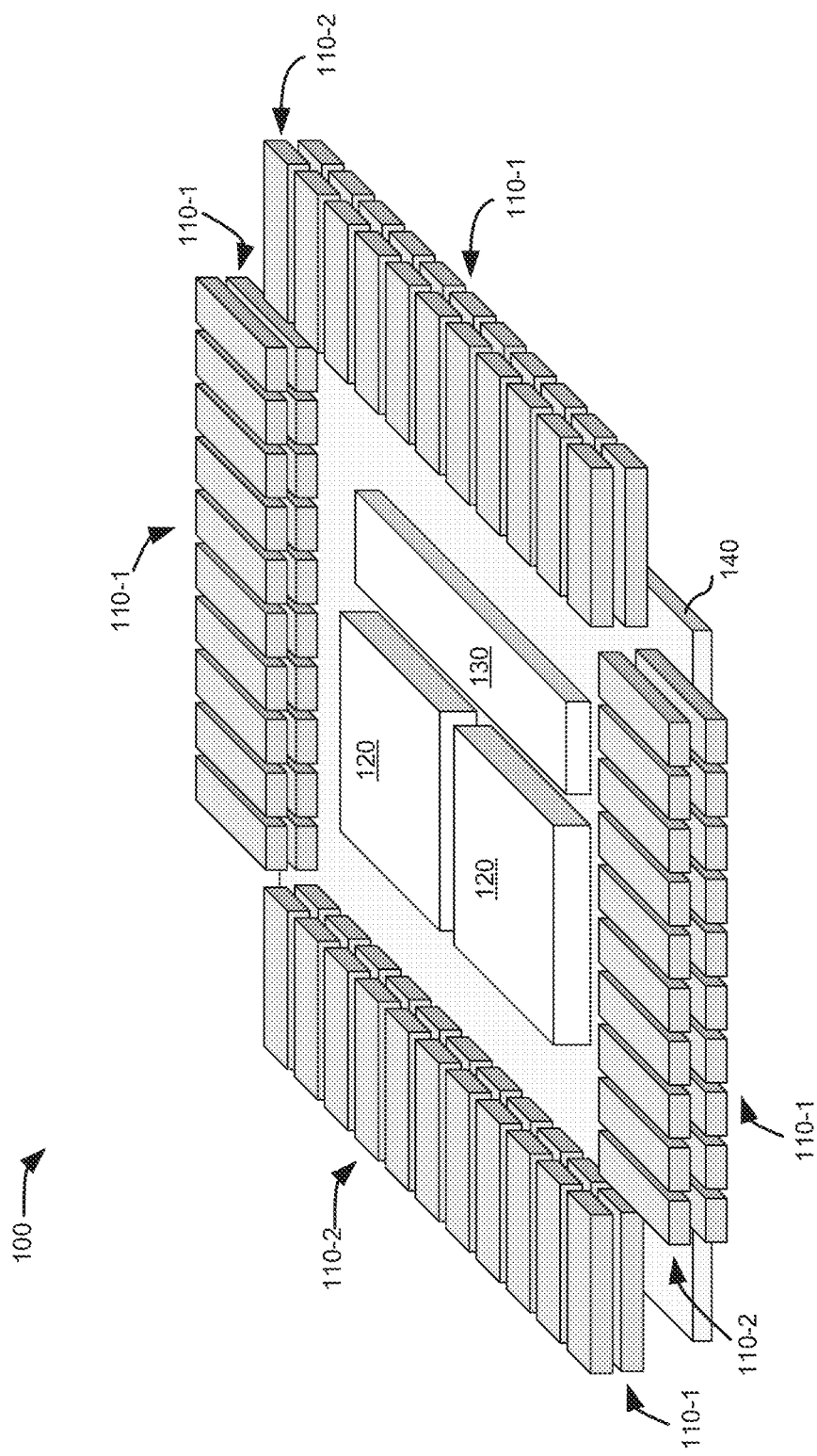
Figure 1C:
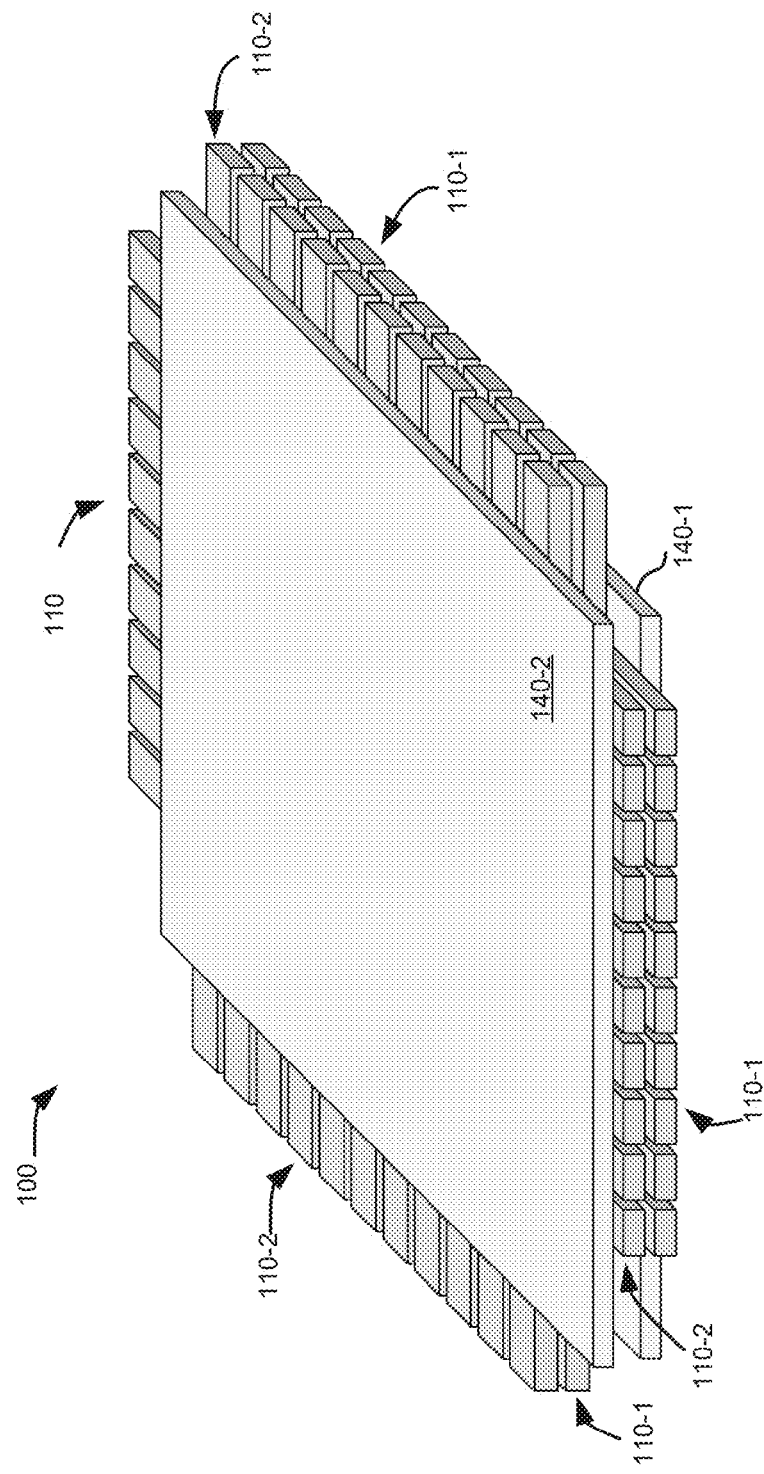

FIGS. 1A-1C are diagrams illustrating network device 100 according to various implementations described herein. As illustrated in FIG. 1A, network device 100 may include optical I/O units 110 (hereafter referred to individually or collectively as optical I/O unit 110), switch fabrics 120 (hereafter referred to individually or collectively as switch fabric 120), and functional element 130 connected to base layer 140.

Optical I/O unit 110 may include components for sending and/or receiving optical signals to/from an optical network. Furthermore, optical I/O unit 110 may include components to input and/or output electrical signals related to the optical signals. In one implementation, optical I/O unit 110 may include, for example, a waveguide and/or other optical components (e.g., a lens, a prism, a filter, a polarizer, a mirror, a shaper, etc.) to transmit an optical signal to and/or from an optical network, a light source to generate the optical signal, a photo-detector to detect the optical signal and convert the optical signal to an electrical signal, a multiplexer to combine the optical signal with other signals, and/or a demultiplexer to separate the optical signal from other optical signals. It should be appreciated that network device 100 may include different types of optical I/O unit 110. For example, network device 100 may include a first type of optical I/O unit 110 to perform a function (e.g., output an optical signal at a first wavelength and/or encoding scheme) and second, different optical I/O unit 110 to perform a different function (e.g., receive an optical signal at a different wavelength or encoding scheme).

Typically, an individual optical I/O unit 110 can handle a particular bandwidth or type of optical signal (e.g., a particular bandwidth, a particular coding scheme, etc.). As depicted in FIG. 1A, network device 100 may include multiple optical I/O units 110 to handle increased bandwidth and/or multiple types of optical signals.

Optical I/O unit 110 may be positioned at an outer edge of base layer 140 to enable optical I/O unit 110 to connect with a connector to exchange an optical signal with an optical network. Optionally, multiple optical I/O units 110 may be positioned on two or more edges of base layer 140, thereby increasing a maximum possible number of optical I/O units 110 that may be fit on base layer 140. Although network device 100 depicted in FIG. 1A includes forty-two optical I/O unit 110 located at four edges of base layer 140, it should be appreciated that network device 100 may include any number of optical I/O units 110, and optical I/O unit 110 may be positioned on any number of edges of base layer 140. For example, as depicted in FIG. 2A, optical I/O unit 110 may be positioned on three edges of base layer 140.

Referring to FIG. 1B, one implementation of network device 100 may include stacked optical I/O units 110-1 and 110-2 to further provide increased bandwidth by increasing the number of optical I/O unit 110 that can fit on network device 100. In this implementation, some optical I/O units 110-1 are positioned directly on base layer 140, and other optical I/O units 110-2 is positioned off of base layer 140. For example, as depicted in FIG. 1B, optical I/O units 110-2 may be mounted to optical I/O units 110-1, which are attached directly to base layer 140. Optical I/O unit 110-1 and 110-2 may still be connected to switch fabric 120 via base layer 140.

Continuing with FIG. 1A, switch fabric 120 may process optical signals sent to or received from an optical network by optical I/O unit 110. For example, switch fabric 120 forward an optical signal to an appropriate optical I/O unit 110 for transmission toward an intended destination.

Typically, a single switch fabric 120 may handle optical signals from multiple optical I/O units 110. Accordingly, network device 100 may include more optical I/O unit 110 than switch fabric 120. Although network device 100 depicted in FIG. 1A includes two switch fabrics 120, it should be appreciated that network device 100 may include a single switch fabric 120 or any number of switch fabrics 120. Furthermore, it should be appreciated that network device 100 may include different types of switch fabric 120. For example, network device 100 may include switch fabric 120 that includes components and programming to perform a first function (e.g., process input signals) and another switch fabric 120 that includes components and programming to perform a second, different function (e.g., process output signals).

Network device 100 may include functional element 130 to perform other tasks. For example, functional element 130 may include circuitry, memory, and/or logic to manage power use by network device 100, monitor and provide feedback regarding performance of network device 100, perform maintenance on network device 100, interface network device 100 with other devices, provide timing signals that coordinate optical I/O unit 110 and switch fabric 120, provide additional functionality and features to users, etc.

Base layer 140 provides a structure for securing optical I/O unit 110, switch fabric 120, and functional element 130. In one implementation, base layer 140 provides one or more communication path(s) between optical I/O unit 110, switch 120, and/or functional element 130. For example, base layer 140 provides optical and/or electrical pathways for communications between optical I/O unit 110, switch 120, and/or functional element 130.

Referring to FIG. 1C, one implementation of network device 100 may include multiple base layers 140-1 and 140-2. Multiple base layers 140-1 and 140-2 may provide increased communications pathways with network device 100. For example, if network device 100 includes stacked optical I/O unit 110-1 and 110-2 (as depicted in FIG. 1B), first layer optical I/O units 110-1 may be positioned near first base layer 140-1, and second layer optical I/O units 110-2 may be positioned near second base layer 140-2. Similarly, base layers 140-1 and 140-2, may be physically coupled to and/or provide communication pathways to, respectively, optical I/O unit 110-1 and 110-2. Further aspects of including multiple base layers 140-1 and 140-2 in network device 100 are discussed with respect to FIG. 3B.

Figure 2B:
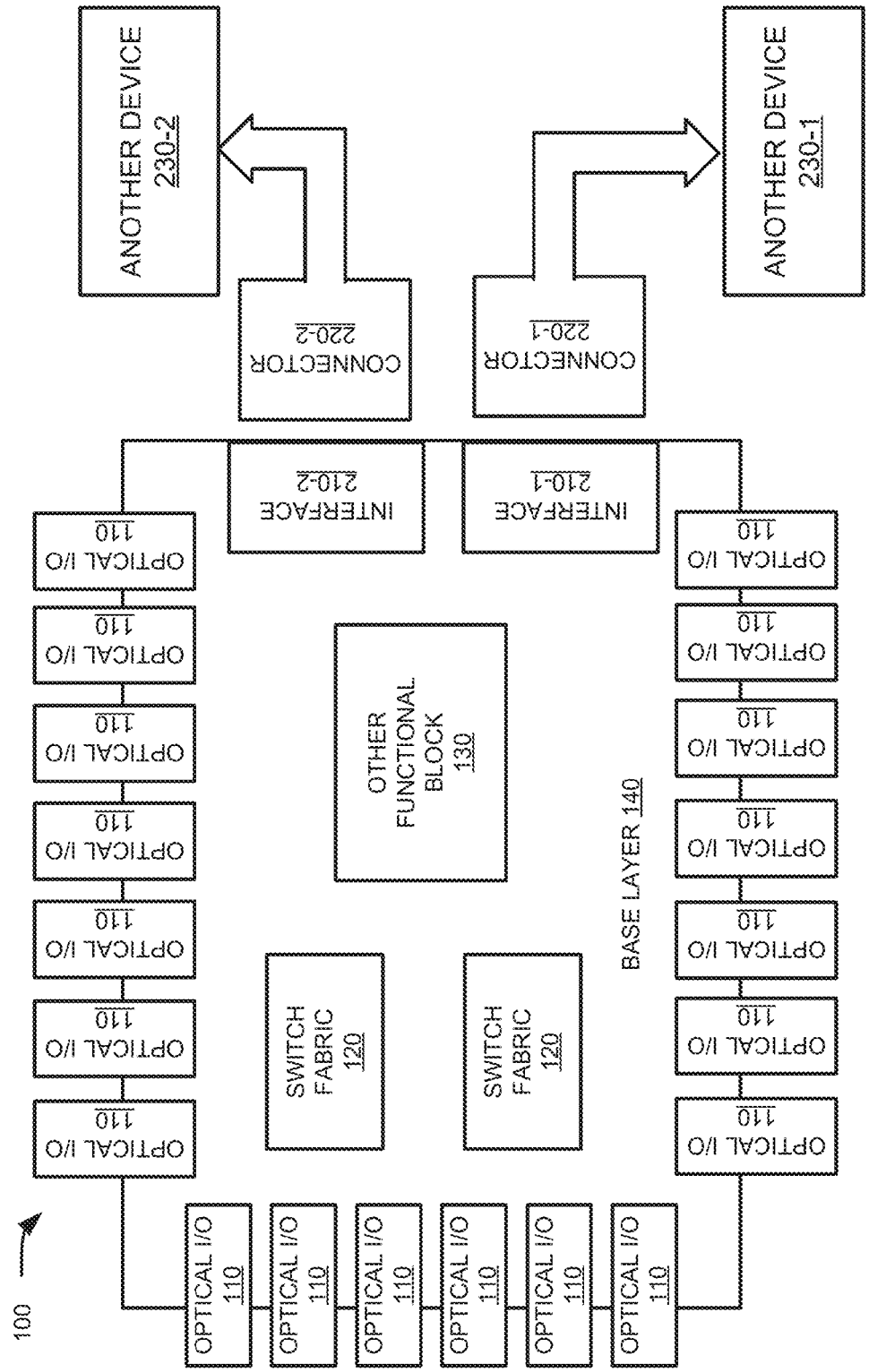
Figure 2C:
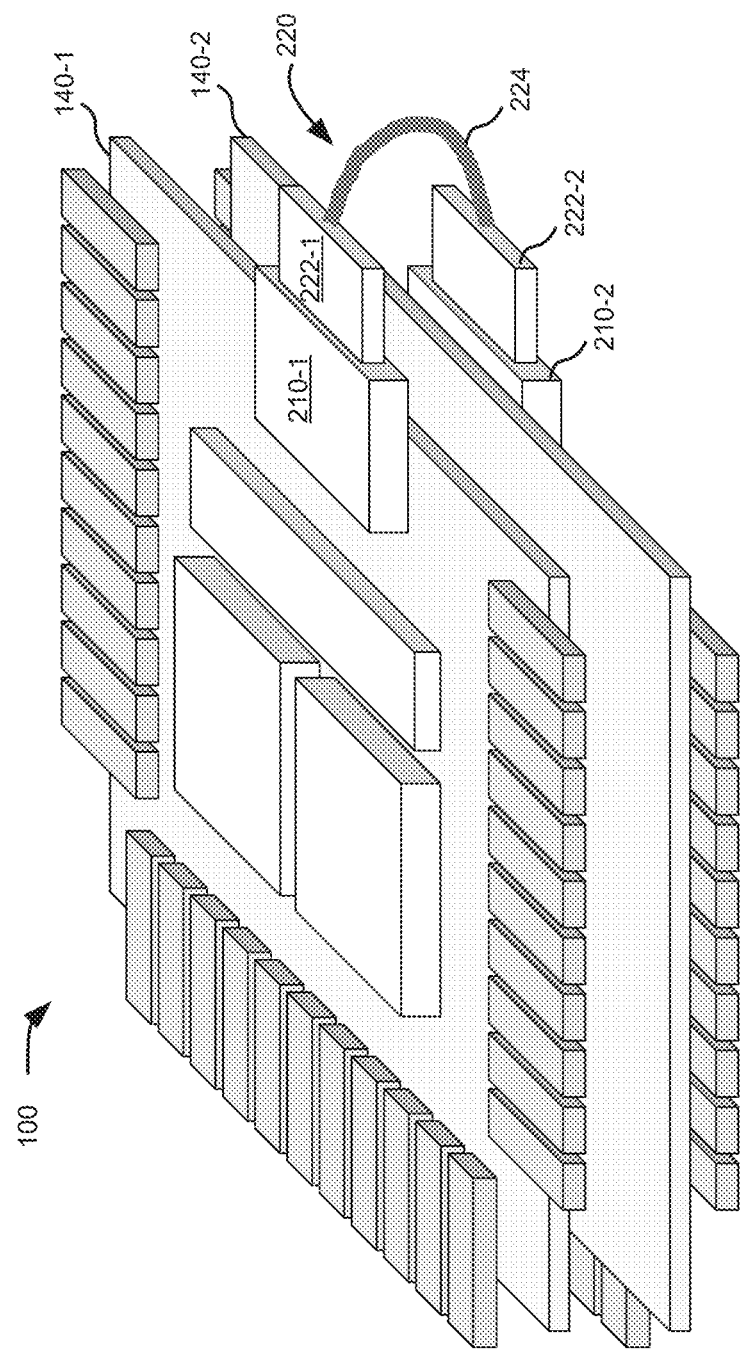

FIGS. 2A-2C are diagrams illustrating network device 100 according to another implementation described herein. As illustrated in FIG. 2A, network device 100 may further include one or more interfaces 210 (referred to, collectively, as interface 210) that are adapted to receive one or more connectors 220 (referred to, collectively, as connector 220) to enable communications between network device 100 and one or more other devices 230 (referred to, collectively, as other device 230). For example, interface 210 may include pins, sockets, wiring, etc. to couple with connector 220 to provide a conductive pathway that enables electric signaling between network device 100 and other device 230. Base layer 140 may provide communications paths between interface 210 and optical I/O unit 110, switch fabric 120, and/or functional element 130.

In one implementation, interface 210 and connector 220 may enable optical communications between network device 100 and the other device 230. Optical communications may provide high bandwidth, scalable connections over relatively long distances in comparison to electrical connections. For example, interface 210 may include components to form and/or receive an optical signal and may include, for example, a waveguide or another optical component (e.g., a lens, a prism, filter, polarizer, mirror, shaper, etc.) to transmit an optical signal to and/or from connector 220, a light source to generate the optical signal, a photo-detector to detect the optical signal and convert the optical signal to an electrical signal, and/or a multiplexer/demultiplexer to combine the optical signal or separate the optical signal from other optical signals. Connector 220 may include a waveguide or other optical components for receiving and transmitting an optical signal.

In one implementation, one or more of optical I/O unit 110, switch 120, functional element 130, or base layer 140 may include a shielding layer (not illustrated) to minimize electromagnetic interference (EMI) or electrostatic discharge (ESD). For example, the shielding layer may include non-conductive material to insulate the network device 100 or individual components of network device 100. Alternatively, the shielding layer may include a grounded static dissipative material that slowly conducts electromagnetic energy away from one or more components of network device 100.

As depicted in FIG. 2B, network device 100 may include multiple interfaces 210-1 and 210-2 that are configured, respectively, to receive connectors 220-1 and 220-2. Interfaces 210-1 and 210-2 may enable network device 100 to communicate to other device 230 with increased bandwidth (i.e., by providing multiple connections between network device 100 and other device 230) or, as depicted in FIG. 2B, may enable network device 100 to communicate with multiple other devices 230-1 and 230-2. Interfaces 210, 210-2 may also enable different types of communications between network device 100 and other devices 230-1 and 230-2. For example, interface 210-1 may be associated with optical communications, and interface 210-2 with electrical communications. Similarly, interfaces 210, 210-2 may be associated with respective different types of optical communications (e.g., different bandwidth, encoding schemes, etc.).

As depicted in FIG. 2C, network device 100 may include base layers 140-1 and 140-2 that include, respectively, interfaces 210-1 and 210-2 connected via connector 220 that includes heads 222-1 and 222-2 and wire 224. In this way, multiple base layers 140-1 and 140-2 may be connected in a modular fashion to provide scaling of communications and processing capabilities in network device 100. Wire 224 may be flexible to enable base layers 140-1 and 140-2 to be positioned and/or moved as desired.

Although FIG. 2C depicts two base layers 140-1 and 140-2 that are coupled by connector 220, it should be appreciated that any number of base layer 140 may be similarly coupled in network device 100. For example, connector 220 may include multiple heads 222 to connect to multiple base layers 140.

Figure 3A:
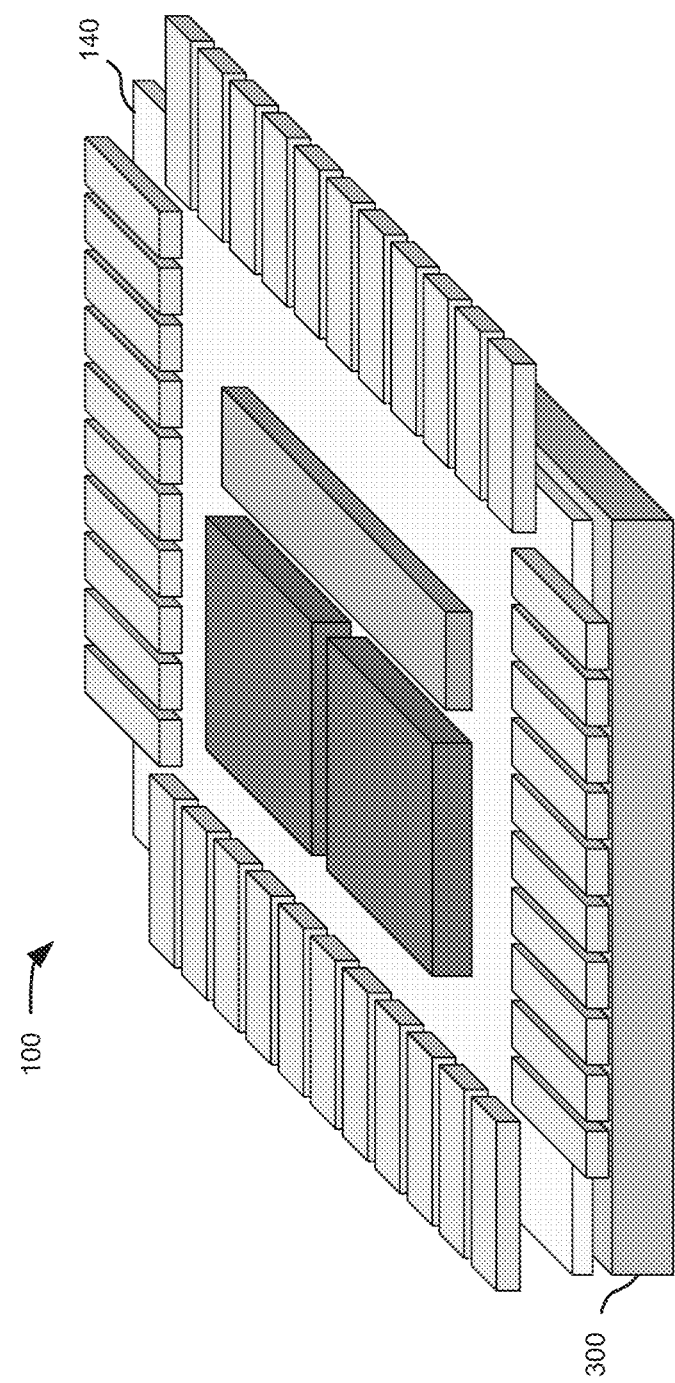
Figure 3B:
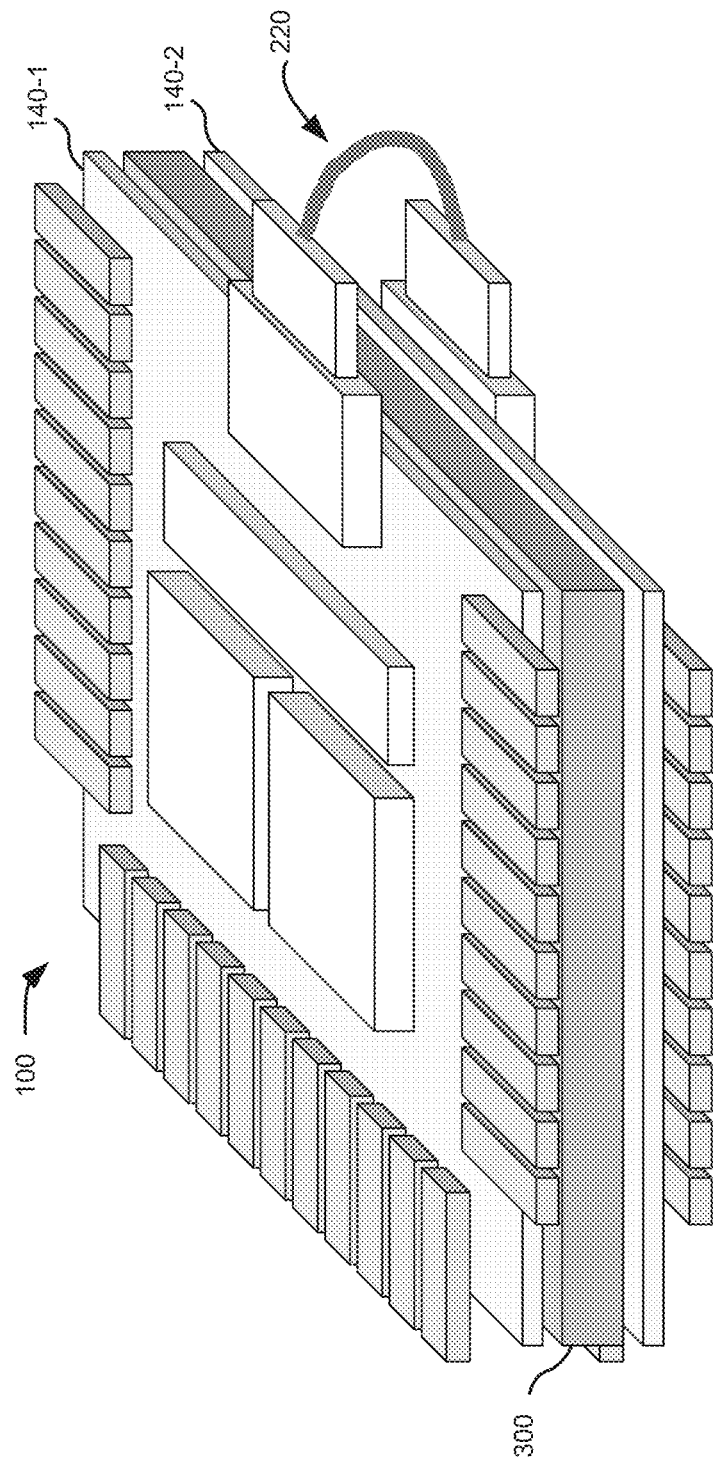
Figure 3C:
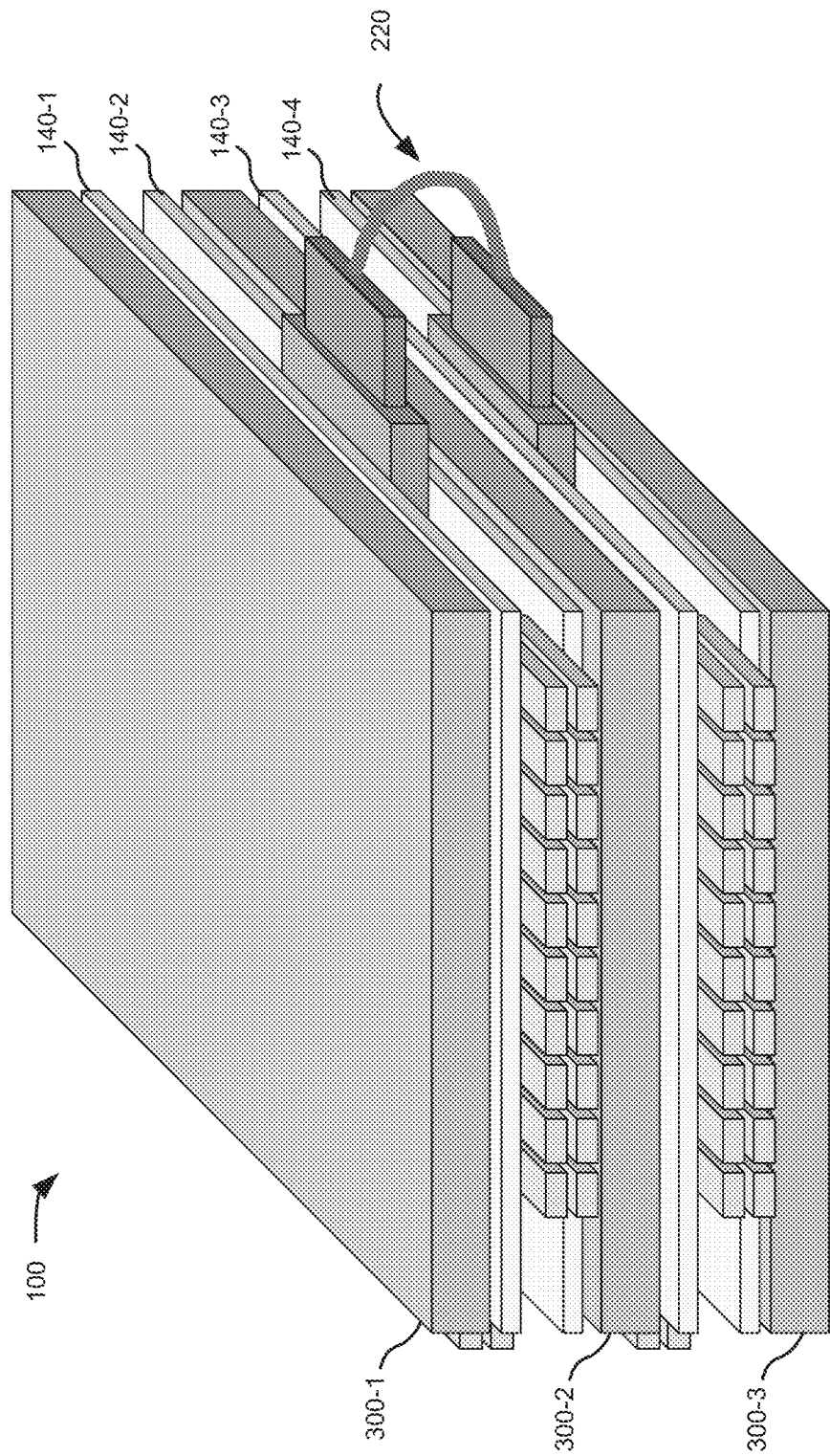

As depicted in FIGS. 3A-3C, one or more cooling units 300 (referred to, collectively, as cooling unit 300) may be included in network device 100. Cooling unit 300 may include, for example, a heat sink, a thermoelectric cooling plate, a liquid cooling unit, a fan or another known device for cooling electronic components.

Typically, cooling unit 300 is positioned in physical proximity to one or more other component of network device 100 to provide cooling effects to those components. For example, as depicted in FIG. 3A, cooling unit 300 may be physically adjacent to base layer 140. Since base layer 140 may be substantially planar, positioning cooling unit 300 adjacent to base layer 140 may maximize surface contact between base layer 140 and cooling unit 300, which may improve cooling of network device 100. Furthermore, when cooling unit 300 cools connections included in base layer 140, cooling unit 300 may indirectly cool other components included in network device 100, such as optical I/O unit 110, switch fabric 120, and/or functional element 130.

With reference to the implementation depicted in FIG. 2C in which base layers 140-1 and 140-2 are connected via connector 220, FIG. 3B depicts an implementation in which cooling unit may be positioned between base layers 140-1 and 140-2. In this implementation, a single cooling unit 300 may cool two or more base layers 140-1 and 140-2. While cooling unit 300 is depicted as having a planar structure and being sized to substantially correspond to the size of base layer 140, it should be appreciated that cooling unit 300 may have any type of shape, size, or other physical configuration. For example, cooling unit 300 may be sufficiently large, such that a surface of cooling unit 300 may contact two or more base layers 140.

When connector 220 is associated with an optical data connection, base layers 140-1 and 140-2 may be positioned to conform to the dimensions of cooling unit 300. In contrast, if connector 220 is an electrical connection, base layers 140-1 and 140-2 may be closely positioned to minimize power consumption and data interference. This may certain types of cooling unit 300 from being used.

As depicted in FIG. 3C, an implementation of network device 100 may include multiple base layers 140-1, 140-2, 140-3, and 140-4 and multiple cooling units 300-1, 300-2, and 300-3. In this implementation, cooling unit 300-1 may cool base layer 104-1; cooling unit 300-2 may cool base layers 104-2 and 104-3; and cooling unit 300-3 may cool base layer 104-4. For example, cooling units 300-1 and 300-2 may cool optical I/O unit 110 and switch fabric 120 associated with base layers 140-1 and 140-2, and cooling unit 300-2 and 300-3 may cool optical I/O unit 110 and switch fabric 120 associated with base layers 140-3 and 140-4.

Base layers 140-1, 140-2, 140-3, and 140-4 may be coupled by connector 220 to enable optical communications such that base layers 140-1, 140-2, 140-3, and 140-4 may be positioned at any distance apart. In this way, base layers 140-1, 140-2, 140-3, and 140-4 may be positioned as needed to accommodate and maximize performance of cooling units 300-1, 300-2, and 300-3.

Although FIGS. 1A-1C, 2A-2C, AND 3A-3C show exemplary components of network device 100, in other implementations, network device 100 may include fewer components, different components, differently arranged components, and/or additional components than those depicted in FIGS. 1A-1C, 2A-2C, AND 3A-3C. Alternatively, or additionally, one or more components of network device 100 may perform one or more tasks described as being performed by one or more other components of network device 100. Furthermore, in FIGS. 1A-1C, 2A-2C, and 3A-3C, the particular arrangement and number of components of network device 100 are illustrated for simplicity. In practice, there may be more optical I/O unit 110, switch fabric 120, functional element 130, base layer 140, interface 210, and/or cooling unit 300. For example, there may be hundreds or even thousands of optical I/O units 110.

FIG. 4 shows network 400 in which network device 100, described herein, may be implemented. Network 400 may include a central office 410 that includes telecommunication equipment 420 such as switches, optical line terminals, etc. that that may be coupled to or include one or more network devices 100. Telecommunication equipment 420 may link central office 410 to another central office 410, optical network 430, data network 440, and/or communications network 450. Telecommunication equipment 420 may also provide telecommunication services to users, such as telephone service, access to the Internet, cable television programs, etc.

Although FIG. 4 shows exemplary components of network 400, in other implementations, network 400 may include fewer components, different components, differently-arranged components, and/or additional components than depicted in FIG. 4. Alternatively, or additionally, one or more components of network 400 may perform one or more tasks described as being performed by one or more other components of network 400.

FIG. 5 is a diagram of exemplary components that may be included in device 500 associated with or including network device 100, such as telecommunications device 420. As depicted in FIG. 5, device 500 may include a bus 510, a processing unit 520, a memory 530, an input device 540, an output device 550, and a communication interface 560.

Bus 510 may permit communication among the components of device 500. Processing unit 520 may include one or more processors or microprocessors that interpret and execute instructions. In other implementations, processing unit 520 may be implemented as or include one or more application specific integrated circuits (ASICs), field programmable gate arrays (FPGAs), or the like.

Memory 530 may include a random access memory (RAM) or another type of dynamic storage device that stores information and instructions for execution by processing unit 520, a read only memory (ROM) or another type of static storage device that stores static information and instructions for the processing unit 520, and/or some other type of magnetic or optical recording medium and its corresponding drive for storing information and/or instructions.

Input device 540 may include a device that permits an operator to input information to device 500, such as a keyboard, a keypad, a mouse, a pen, a microphone, one or more biometric mechanisms, and the like. Output device 550 may include a device that outputs information to the operator, such as a display, a speaker, etc.

Communication interface 560 may include network device 100 to enable device 500 communicate with an optical network 430. Communication interface 560 may further include a transceiver (e.g., a transmitter and/or receiver) that enables device 500 to communicate with other devices and/or systems. For example, communication interface 560 may include mechanisms for communicating with other devices, such as other devices of network 400 or another device 500.

As described herein, device 500 may perform certain operations in response to processing unit 520 executing software instructions contained in a computer-readable medium, such as memory 530. A computer-readable medium may be defined as a non-transitory memory device. A memory device may include space within a single physical memory device or spread across multiple physical memory devices. The software instructions may be read into memory 530 from another computer-readable medium or from another device via communication interface 560. The software instructions contained in memory 530 may cause processing unit 520 to perform processes described herein. Alternatively, hardwired circuitry may be used in place of or in combination with software instructions to implement processes described herein. Thus, implementations described herein are not limited to any specific combination of hardware circuitry and software.

Although FIG. 5 shows exemplary components of device 500, in other implementations, device 500 may include fewer components, different components, differently-arranged components, or additional components than depicted in FIG. 5. As an example, in some implementations, input device 540 and/or output device 550 may not be implemented by device 500. In these situations, device 500 may be a "headless" device that does not explicitly include an input or an output device. Alternatively, or additionally, one or more components of device 500 may perform one or more other tasks described as being performed by one or more other components of device 500.

Figure 6:
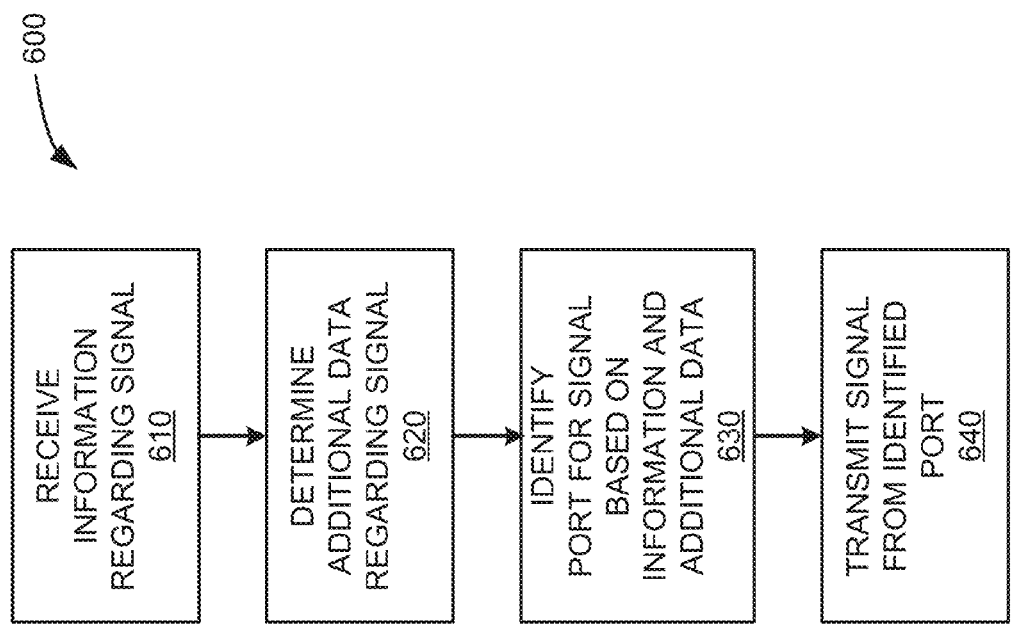
FIG. 6 is a flow diagram of an exemplary process for processing an optical signal according to an implementation described herein.

FIG. 6 provides an exemplary flow diagram 600 for transmitting an optical signal using a device, such as telecommunications device 420 that includes network device 100, that may connect optical I/O unit 110 and switch fabric 120 without a backplane. Information regarding an optical signal may be received (block 610). For example, telecommunications device 420 may detect an optical signal received by optical I/O unit 110 from optical network 430 or telecommunications device 420 may receive information regarding an optical signal to be transmitted to optical network 430 from optical I/O unit 110. The received information may include, for example, an address for a source of the optical signal, an address for an intended destination of the optical signal, data to be transmitted in the optical signal, and configuration information related to transmission of the optical signal (e.g., quality of service or an encoding scheme), etc.

Additional data related to transmission of the optical signal may be determined (block 620). For example, telecommunications device 420 may determine, based on the intended destination and the received information, a frequency for transmission of the optical signal and routing information. In block 620, other data may be determined based on other consideration. For example, an intended path for transmission of the signal may be determined based on network congestion, status of network components, available next hops, etc.

A port for transmission of the signal may be identified based on the received information and/or the determined additional data (block 630). For example, telecommunications device 420 may identify a port that is associated with optical I/O unit 110 that outputs the signal toward the intended destination. If the port is not available through a network device 100 (e.g., the port is not functional or is busy), telecommunications device 420 may determine whether the port is available through another network device 100 connected to telecommunications device 420.

Network device 100 may transmit the optical signal through the identified port (block 640). For example, the signal may be sent from optical I/O unit 110 associated with identified port based on the received information and the additional data. If the identified port is associated with another network device 100, the instructions to transmit the signal may be sent to the other network device 100 to initiate transmission of the signal from the identified port.

Although FIG. 6 shows an exemplary process for forwarding transmitting an optical signal using a device, in other implementations, additional, fewer, or different steps may be performed than those depicted in FIG. 6. For example, in other implementations, transmission of the signal may include retransmission of the signal from a port receiving the signal from optical network 430 or cooling the identified port using, for example, cooling unit 300.

Figure 7A:
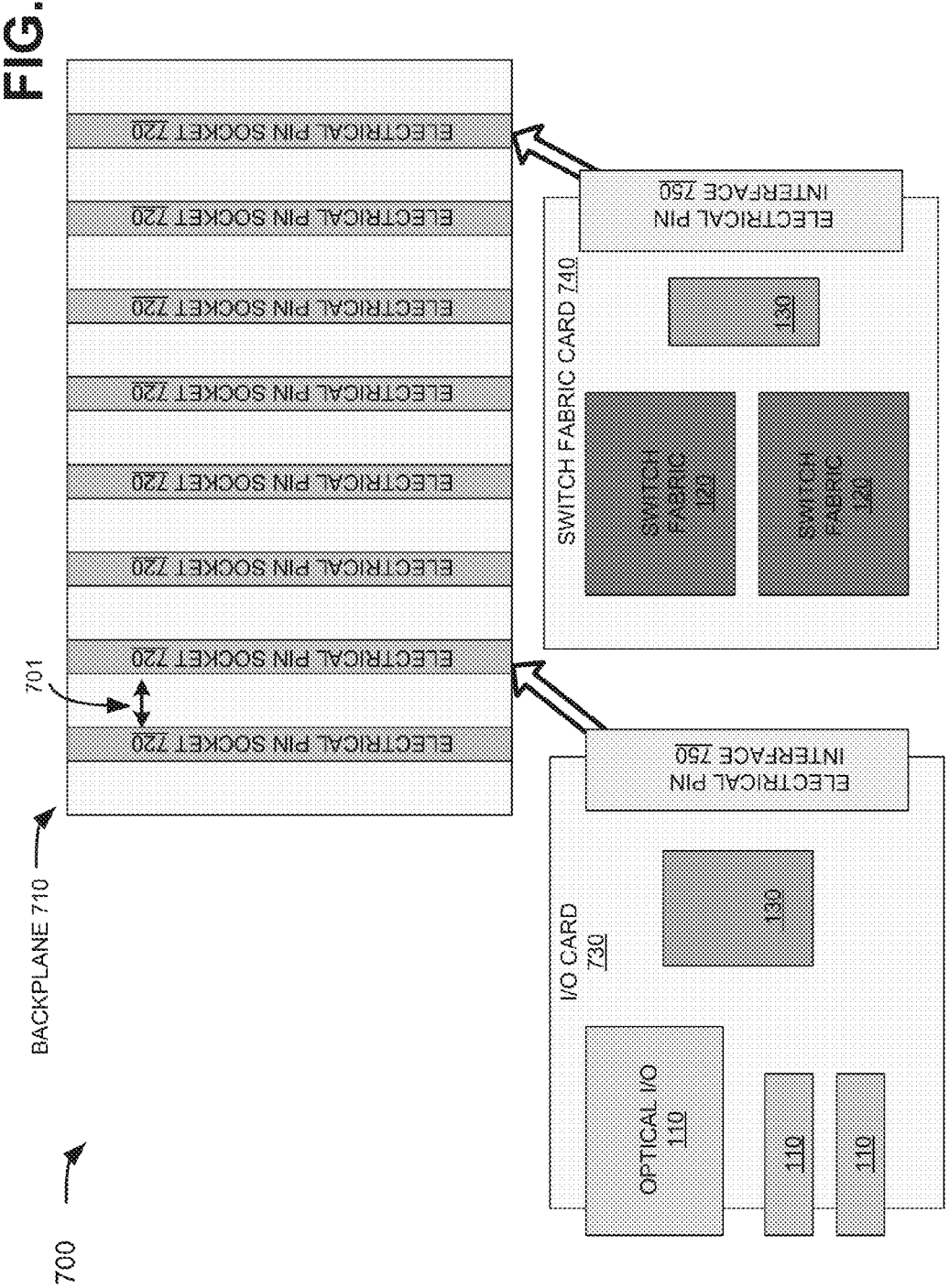

FIGS. 7A-7B are diagrams depicting examples of components that may be included in an alternative device 700. As depicted in FIGS. 7A-7B, alternative device 700 may include a backplane 710, with multiple electrical pin sockets 720 (referred to, collectively, as electrical pin socket 720) separated by a distance 701. Each electrical pin socket 720 may be configured to receive input/output (I/O) card 730 or switch fabric card 740.

As depicted in FIG. 7A, I/O card 730 may include optical I/O unit 110 and electrical pin interface 750, and switch fabric card 740 may include switch fabric 120 and electrical pin interface 750. Backplane 710 may include electrical connections between electrical pin socket 720, and when I/O card 730 and switch fabric card 740 are installed in backplane 710, electrical pin interface 750 may couple to electrical pin socket 720. In this way, I/O card 730 and switch fabric card 740 may be connected via electrical connections in backplane 710.

As previously described, switch fabric 120 may handle multiple optical I/O units 110. As depicted in FIG. 7B, alternative device 700 may use multiple I/O cards 730 with switch fabric card 740. Using multiple I/O cards 730 may cause alternative device 700 to be large and to consume additional power. Furthermore, due to the nature of electrical connections, distances 701 between the electrical pin sockets 720 may be minimized to reduce power consumption and interference between electrical transmissions. Thus, as depicted in FIG. 7B, I/O card 730 and switch fabric card 740 in alternative device 700 may be closely positioned, making it difficult to use cooling units, such as cooling units 300. Furthermore, even if a cooling unit is used, the cooling unit may need to be adapted to conform to distance 701, because distance 701 cannot be easily changed in backplane 710.

I/O card 730 may typically include optical I/O unit 110 on only one edge since one edge of I/O card 730 is dedicated to electrical pin interface 750 and other edges of I/O card 730 may be blocked by an enclosure associated with backplane 710 (not illustrated).

Due to the nature of electrical connections, backplane 710 may limit the total bandwidth capacity between the cards, with bandwidth being limited by a number of electric pins included in electrical pin socket 720. Furthermore, bandwidth through backplane 701 is difficult to modify or scale. For example, increasing bandwidth through backplane 710 may require increasing a number of pins included in electrical pin socket 720 and a number of electrical connections within backplane 710, thereby increasing costs and complexity of backplane 710.

According to implementations described herein, a device include optical I/O unit and a switch fabric that communicate without a backplane. The device may further include an interface to enable the device to communicate with other devices, preferable through an optical connection that enables low power, high-speed connection between the devices even at relatively large distances. The device may be used in connection with one or more cooling units.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:
1. A network device comprising:
  a plurality of first optical input/output (I/O) units to exchange optical signals with an optical network, wherein each of the plurality of first optical I/O units includes:
    a light source to generate a first optical signal of the optical signals, and
    a photo-detector to receive a second optical signal of the optical signals;
  a first switch fabric to process the optical signals;
  a first base layer connecting to the plurality of first optical I/O units and the first switch fabric, wherein:
    the first base layer is included in a connection that enables communications between the plurality of first optical I/O units and the first switch fabric,
    the connection omits a backplane, and
    the plurality of first optical I/O units are positioned on two more edges of the first base layer to exchange the optical signals with the optical network;
  a second base layer that differs from the first base layer, wherein a first cooling unit is positioned proximate to the first base layer and the second base layer, and wherein the first base layer and the second base layer are separated by a distance corresponding to a width associated with the first cooling unit;

a second switch fabric coupled to the second base layer; and a plurality of second optical I/O units positioned on two or more edges of the second base layer.

2. The network device of claim 1, further comprising:
an interface configured to receive a connector to couple the network device to another device.

3. The network device of claim 2, wherein the interface and the connector enable optical communications between the network device and the other device.

4. The network device of claim 2, further comprising:
a plurality of interfaces that include the interface,
wherein the network device connects to a plurality of other devices via, respectively, the plurality of interfaces.

5. The network device of claim 1, wherein a second cooling unit is positioned proximate to the first base layer and away from the second base layer.

6. The network device of claim 1, wherein:
the plurality of first optical I/O units include a first layer of optical I/O units and a second layer of optical I/O units,
the first layer of optical I/O units are mounted to the first base layer, and
the second layer of optical I/O units are mounted on the first layer of optical I/O units and away from the first base layer.

7. A network device comprising:
a plurality of optical input/output (I/O) units to exchange one or more optical signals with an optical network;
a switch fabric to process the one or more optical signals exchanged with the optical network;
an interface to receive a connector to couple the network device to another device;
a first base layer coupling the plurality of optical I/O units and the switch fabric, wherein the first base layer is included in a connection enabling communications between the plurality of optical I/O units, the switch fabric, and the connector, and wherein the connection omits a backplane; and
a second base layer coupled to one or more of the plurality of optical I/O units,
wherein a first cooling unit is positioned proximate to the first base layer and between the first base layer and the second base layer, wherein a second cooling unit is positioned proximate to the second base layer, and wherein the first base layer and the second base layer are separated by a distance corresponding to a width associated with the first cooling unit.

8. The network device of claim 7, wherein the interface and the connector enable optical communications between the network device and the other device.

9. The network device of claim 7, wherein:
the plurality of optical I/O units include a first layer of optical I/O units and a second layer of optical I/O units,
the first layer of optical I/O units are mounted to the first base layer, and
the second layer of optical I/O units are mounted on the first layer of optical I/O units and away from the first base layer.

10. The network device of claim 7, further comprising:
a plurality of interfaces that include the interface,
wherein the network device connects to a plurality of other devices via, respectively, the plurality of interfaces.

11. The network device of claim 7, wherein the network device is positioned in a central office.

12. The network device of claim 7, wherein:
the plurality of optical I/O units include a plurality of first optical I/O units,
the switch fabric includes a first switch fabric, and
the network device further includes a second switch fabric coupled to the second base layer, and a plurality of second optical I/O units coupled to the second switch fabric and positioned on two or more edges of the second base layer.

13. The network device of claim 7, wherein the first cooling unit includes a heat sink, a thermoelectric cooling plate, a liquid cooling unit, or a fan.

14. The network device of claim 1, wherein the network device is coupled to another device that includes another optical I/O unit that exchanges another optical signal that differs from the optical signals exchanged by the plurality of first optical I/O units, and
wherein the first switch fabric processes that other optical signal.

15. The network device of claim 14, wherein the network device and the other device are coupled via an electrical backplane.

16. The network device of claim 7, wherein the other device includes another optical I/O unit that exchanges another optical signal that differs from the one or more optical signals exchanged by the plurality of optical I/O units, and
wherein the switch fabric processes that other optical signal.

17. The network device of claim 7, wherein the one or more optical signals includes a first optical signal and a second optical signal, and wherein an optical I/O unit, included in the plurality of optical I/O units, includes:
a light source to generate the first optical signal, and
a photo-detector to receive the second optical signal.

* * * * *